United States Patent
Shin et al.

(10) Patent No.: US 9,060,118 B2
(45) Date of Patent: Jun. 16, 2015

(54) IMAGE SYSTEMS AND SENSORS HAVING FOCUS DETECTION PIXELS THEREIN

(71) Applicant: Samsung Electronics Co., Ltd., Suwon-si (KR)

(72) Inventors: Jin Hun Shin, Seoul (KR); Ji Min Cheon, Yongin-si (KR); Dong Hun Lee, Yongin-si (KR); Hyeok Jong Lee, Yongin-si (KR); Jin Ho Seo, Seoul (JP); Woo Seok Choi, Suwon-si (KR); Seog Heon Ham, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 56 days.

(21) Appl. No.: 13/827,277

(22) Filed: Mar. 14, 2013

(65) Prior Publication Data

US 2013/0321694 A1 Dec. 5, 2013

(30) Foreign Application Priority Data

May 30, 2012 (KR) .......................... 10-2012-0057714

(51) Int. Cl.
*H04N 5/232* (2006.01)
*H04N 5/369* (2011.01)

(52) U.S. Cl.
CPC ......... *H04N 5/23212* (2013.01); *H04N 5/3696* (2013.01)

(58) Field of Classification Search
CPC .......................... H04N 5/2356; H04N 5/23212
USPC .................................. 348/349, 350, 345, 308
See application file for complete search history.

(56) References Cited

U.S. PATENT DOCUMENTS

| | | | |
|---|---|---|---|
| 8,102,463 B2 | 1/2012 | Komaba et al. | |
| 2009/0086084 A1* | 4/2009 | Komaba et al. | 348/349 |
| 2009/0096886 A1 | 4/2009 | Kusaka | |
| 2009/0135273 A1* | 5/2009 | Kusaka | 348/222.1 |
| 2009/0213255 A1* | 8/2009 | Suzuki | 348/302 |
| 2010/0045849 A1* | 2/2010 | Yamasaki | 348/349 |
| 2011/0267511 A1* | 11/2011 | Imafuji | 348/294 |
| 2011/0285899 A1 | 11/2011 | Hirose | |

FOREIGN PATENT DOCUMENTS

| | | |
|---|---|---|
| JP | 2009-089132 | 4/2009 |
| JP | 2009-177741 | 8/2009 |
| JP | 2010-185998 | 8/2010 |
| JP | 2010-272903 | 12/2010 |
| JP | 2011-033975 | 2/2011 |
| JP | 2011-250325 | 12/2011 |

* cited by examiner

*Primary Examiner* — Sinh Tran
*Assistant Examiner* — Zhenzhen Wu
(74) *Attorney, Agent, or Firm* — Myers Bigel Sibley & Sajovec, PA

(57) ABSTRACT

Image sensors include an array of image sensor pixels therein. This array of image sensor pixels includes a first focus detection pixel and at least a first color pixel. A switching network is provided, which is electrically coupled to the array. This switching network may be configured to generate a first mixed image signal by electronically mixing a focus detection signal generated by the first focus detection pixel with at least one color pixel signal generated by the at least a first color pixel. The first focus detection pixel can be a color-blind pixel, which may include a light-blocking shield mask therein.

24 Claims, 10 Drawing Sheets

IMAGE SYSTEMS AND SENSORS HAVING FOCUS DETECTION PIXELS THEREIN

REFERENCE TO PRIORITY APPLICATION

This application claims priority under 35 U.S.C. §119(a) from Korean Patent Application No. 10-2012-0057714 filed on May 30, 2012, the disclosure of which is hereby incorporated herein by reference in its entirety.

FIELD

This invention relates to image sensors and systems and, more particularly, to image sensors and systems that perform focus detection.

BACKGROUND

With the trend to compactness and light weight in the digital era, the market in mirrorless interchangeable lens cameras produced by removing a mirror box and pentaprism from digital single-lens reflex (DSLR) cameras is increasing.

Since a mirrorless interchangeable lens camera does not include a mirror box, a phase-difference autofocus method used in a DSLR camera cannot be used. Accordingly, the mirrorless interchangeable lens camera usually uses a contrast autofocus method. The mirrorless interchangeable lens camera includes an image sensor. The image sensor is a device that converts an optical image signal into an electrical image signal. Recently, demands for applying the phase-difference autofocus method to mirrorless interchangeable lens camera systems has increased.

SUMMARY

Image sensor embodiments of the present invention include an array of image sensor pixels therein. This array of image sensor pixels includes a first focus detection pixel and at least a first color pixel. A switching network is also provided, which is electrically coupled to the image sensor array. This switching network may be configured to generate a first mixed image signal by electronically mixing a focus detection signal generated by the first focus detection pixel with at least one color pixel signal generated by the at least a first color pixel. According to some embodiments of the invention, the first focus detection pixel is a color-blind pixel, which may include a light-blocking shield mask therein. According to additional embodiments of the invention, the switching network may include first and second transmission paths, which are configured to pass the focus detection signal and the at least one color pixel signal, respectively, to a commonly-connected node. These first and second transmission paths may be switch-enabled transmission paths containing first and second serially-connected capacitors, respectively. For example, the first transmission path may include a first serially-connected capacitor, which is configured to filter the focus detection signal, and the second transmission path may include a second serially-connected capacitor, which is configured to filter the at least one color pixel signal. A processing circuit may also be provided, which has an analog-to-digital (ADC) converter therein. This ADC converter may include a comparator having a first terminal configured to receive the first mixed image signal and a second terminal configured to receive a ramp signal.

An image sensing system according to additional embodiments of the invention may include an image sensor, which is configured to perform a phase-difference autofocus operation by electronically mixing a color-blind focus detection signal generated by a first focus detection pixel within an active pixel array with a first color pixel signal generated by a first color pixel within the active pixel array. In particular, the electronically mixing may include passing the color-blind focus detection signal in series through a first capacitor to a common node concurrently with passing the first color pixel signal in series through a second capacitor to the common node. This mixing operation may further include performing an analog-to-digital conversion operation on a mixed signal generated at the common node.

According to additional embodiments of the inventive concept, there is provided an image sensor including an active pixel array including a focus detection pixel and a first color pixel, a switching network configured to generate a first mixed signal by mixing a focus detection signal output from the focus detection pixel with a first pixel signal output from the first color pixel and to generate the first pixel signal as a second mixed signal, a processing circuit configured to process the first mixed signal and the second mixed signal, and a calculator configured to a signal generated by the focus detection pixel based on a difference between a processed first mixed signal and a processed second mixed signal.

The switching network may include a plurality of first transmission paths configured to transmit the focus detection signal, a plurality of second transmission paths configured to transmit the first pixel signal, and an array of switches configured to be controlled to connect one of the first transmission paths with one of the second transmission paths to generate the first mixed signal and to be controlled to generate an output signal of another one of the second transmission paths as the second mixed signal in response to switching control signals. The first transmission paths and the second transmission paths may include a capacitor, respectively.

The active pixel array may further include a second color pixel generating a second pixel signal. At this time, the switching network may generate the first mixed signal by mixing the focus detection signal, the first pixel signal, and the second pixel signal with one another and generate the second mixed signal by mixing the first pixel signal with the second pixel signal.

The switching network may include a plurality of first transmission paths configured to transmit the focus detection signal; a plurality of second transmission paths configured to transmit the first pixel signal; a plurality of third transmission paths configured to transmit the second pixel signal; and an array of switches configured to be controlled to connect one of the first transmission paths, one of the second transmission paths, and one of the third transmission paths with one another to generate the first mixed signal and to connect another one of the second transmission paths with another one of the third transmission paths to generate the second mixed signal in response to switching control signals. The first transmission paths, the second transmission paths, and the third transmission paths may include a capacitor, respectively.

The processing circuit may include a plurality of comparators configured to compare the first mixed signal and the second mixed signal, respectively, with a ramp signal.

According to other embodiments of the inventive concept, there is provided an image sensing system including the image sensor and a digital signal processor configured to control an operation of the image sensor. A switching network may be provided, which includes a plurality of first transmission paths configured to transmit the focus detection signal, a plurality of second transmission paths configured to transmit the first pixel signal, and an array of switches configured to be controlled to connect one of the first transmission paths with one of the second transmission paths to generate the first mixed signal and to be controlled to generate an output signal of another one of the second transmission paths as the second mixed signal in response to switching control signals.

The active pixel array may further include a second color pixel generating a second pixel signal. At this time, the switching network may generate the first mixed signal by mixing the focus detection signal, the first pixel signal, and the second pixel signal with one another and generate the second mixed signal by mixing the first pixel signal with the second pixel signal.

The switching network may include a plurality of first transmission paths configured to transmit the focus detection signal; a plurality of second transmission paths configured to transmit the first pixel signal; a plurality of third transmission paths configured to transmit the second pixel signal; and an array of switches configured to be controlled to connect one of the first transmission paths, one of the second transmission paths, and one of the third transmission paths with one another to generate the first mixed signal and to connect another one of the second transmission paths with another one of the third transmission paths to generate the second mixed signal in response to switching control signals.

According to further embodiments of the inventive concept, there is provided an operation method of an image sensor. The operation method includes generating a focus detection signal using a focus detection pixel and a first pixel signal using a first color pixel, generating a first mixed signal by mixing the focus detection signal with the first pixel signal and generating a second mixed signal using the first pixel signal, processing the first mixed signal and the second mixed signal, and calculating a signal generated by the focus detection pixel based on a difference between a processed first mixed signal and a processed second mixed signal.

The operation method may further include generating a second pixel signal using a second color pixel. At this time, the first mixed signal may be a signal related with the focus detection signal, the first pixel signal, and the second pixel signal and the second mixed pixel signal may be a signal related with the first pixel signal and the second pixel signal.

DETAILED DESCRIPTION OF THE EMBODIMENTS

Figure 1:
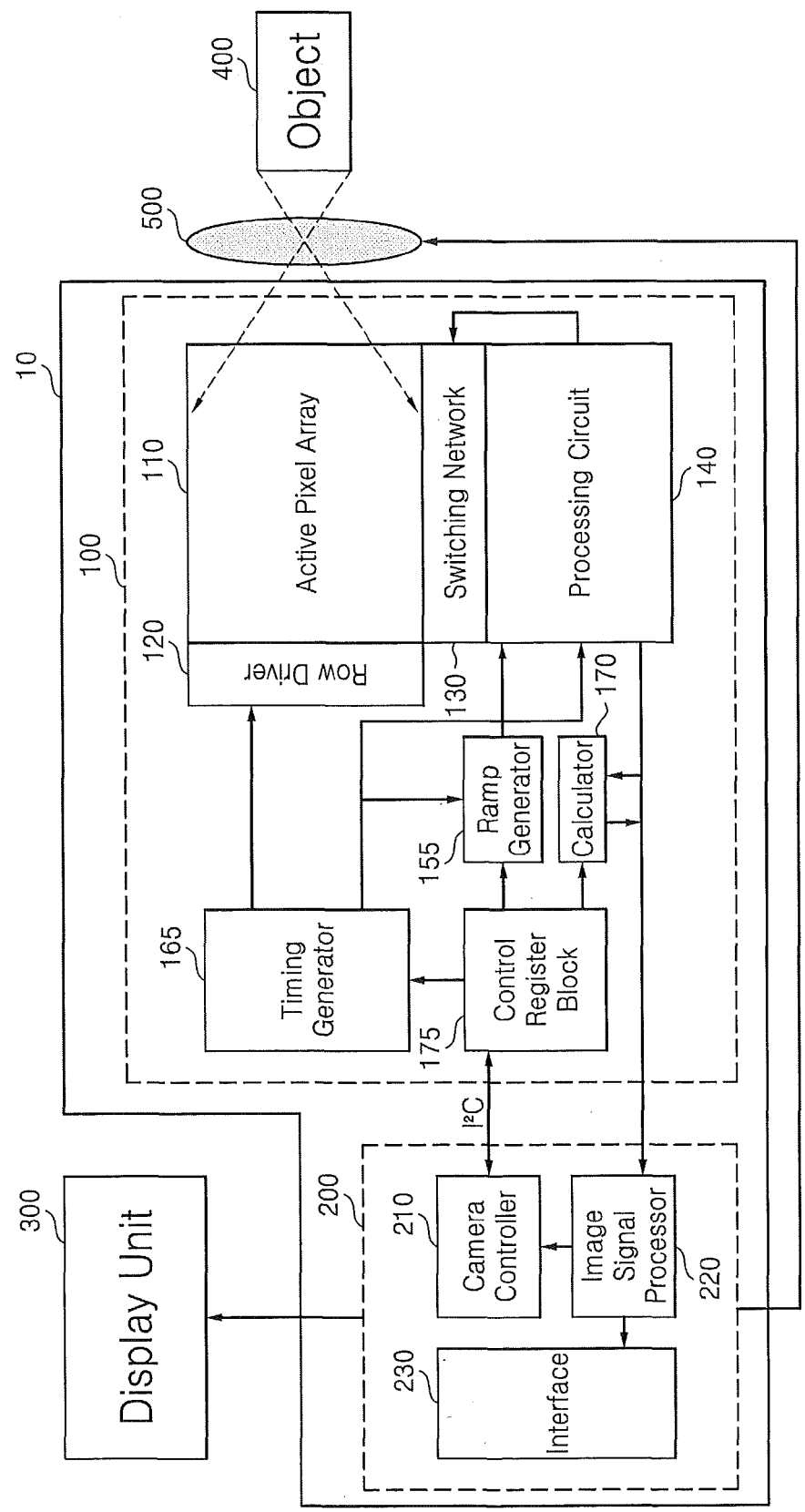
FIG. 1 is a schematic block diagram of an image sensing system including an image sensor according to some embodiments of the inventive concept.
Figure 2:
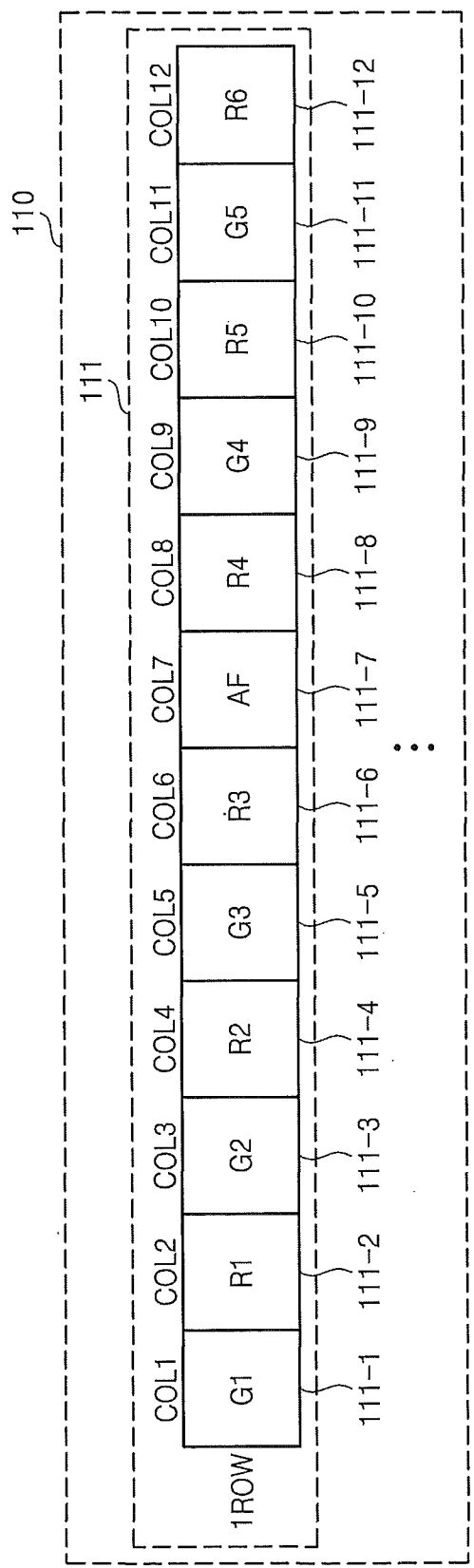
FIG. 2 is a detailed diagram of an active pixel array illustrated in FIG. 1.

FIG. 1 is a schematic block diagram of an image sensing system 10 including an image sensor 100 according to some embodiments of the inventive concept. FIG. 2 is a detailed diagram of an active pixel array 110 illustrated in FIG. 1. Referring to FIGS. 1 and 2, the image sensing system 10 includes the image sensor 100 and a digital signal processor 200. The image sensing system 10 may be used in digital cameras or portable devices equipped with a digital camera. The image sensing system 10 may sense an object 400 or an image of the object 400, which is input through a lens 500, according to the control of the digital signal processor 200. The digital signal processor 200 may process an image signal sensed and output by the image sensor 100 to generate an image and output the image to a display unit 300. The display unit 300 may be any device that can display images. For instance, the display unit 300 may be a display of a computer or a portable device.

The digital signal processor 200 may include a camera controller 210, an image signal processor 220, and an interface 230. The digital signal processor 200 may perform a phase-difference autofocus method based on a signal generated by a focus detection pixel 111-7 to control the moving direction and/or moving distance of the lens 500.

The camera controller 210 may control a control register block 175. The camera controller 210 may control the image sensor 100 and more particularly the control register block 175 using an inter-integrated circuit ($I^2C$), but the inventive concept is not restricted thereto.

The image signal processor 220 may receive an image signal processed by a processing circuit 140, generate an image based on the processed image signal, and output the image to the display unit 300 via the interface 230. In addition, the image signal processor 220 may receive a signal calculated by a calculator 170 (e.g., a signal generated by the focus detection pixel 111-7) and may perform a phase-difference autofocus method based on the signal generated by the focus detection pixel 111-7. For instance, the image signal processor 220 may calculate a defocus amount using the signal generated by the focus detection pixel 111-7 and control the focal distance position of the lens 500 based on the defocus amount. It is illustrated in FIG. 1 that the image signal processor 220 is positioned within the digital signal processor 200, but the image signal processor 220 may be implemented outside the image sensor 100.

The image sensor 100 includes the active pixel array 110, a row driver 120, a switching network 130, the processing circuit 140, a ramp generator 155, a timing generator 165, the calculator 170, and the control register block 175, coupled as illustrated. The active pixel array 110 may include a plurality of pixels arranged in a matrix of rows and columns. Among the rows, only a first row 1ROW is illustrated and pixels only from a first column COL1 to a twelfth column COL12 in the first row 1ROW are illustrated in FIG. 2 for convenience' sake in the description.

A plurality of pixels 111 in the first row 1ROW may include color pixels 111-1 through 111-6 and 111-8 through 111-12 and the focus detection pixel 111-7. The focus detection pixel 111-7 may be randomly positioned among the rows in the active pixel array 110. The color pixels 111-1 through 111-6 and 111-8 through 111-12 and the focus detection pixel 111-7 may include a plurality of transistors and a photo sensitive device. The photo sensitive device may be a photo diode, a phototransistor, or a pinned photo diode. The color pixels 111-1 through 111-6 and 111-8 through 111-12 may also include a color filter. The color filter may be a red filter transmitting light in the red spectrum, a green filter transmitting light in the green spectrum, or a blue filter transmitting light in the blue spectrum. Alternatively, the color filter may be a cyan filter, a magenta filter, or a yellow filter. Thus, the color pixels 111-1 through 111-6 and 111-8 through 111-12 may sense light using the photo sensitive device and convert the sensed light into an electrical signal to generate a pixel signal.

The focus detection pixel 111-7 may include a transparent film or a white film instead of a color filter such as a red filter, a green filter, a blue filter, a cyan filter, a magenta filter, or a yellow filter. The focus detection pixel 111-7 may be provided with a shield mask on the photo sensitive device to artificially eliminate about half of the light coming in through the lens 500. For instance, the focus detection pixel 111-7 may artificially eliminate about half of the light coming in through the lens 500 in a horizontal direction and/or a vertical direction using the shield mask. The focus detection pixel 111-7 may sense light other than the light eliminated by the shield mask using the photo sensitive device and convert the sensed light into an electrical signal to generate a focus detection pixel signal.

The timing generator 165 outputs a control signal to each of the row driver 120, the processing circuit 140, and the ramp generator 155 to control the operation of each element 120, 140, or 155.

The control register block 175 outputs a control signal to each of the ramp generator 155, the timing generator 165, the processing circuit 140, and the calculator 170 to control the operation of each element 155, 165, 140, or 170. The control register block 175 operates according to the control of the camera controller 210.

The row driver 120 may drive the active pixel array 110 in units of rows. For instance, the row driver 120 may generate a row selection signal. In detail, the row driver 120 may decode a row control signal (e.g., a row address signal) generated by the timing generator 165 and select at least one row line from among a plurality of row lines included in the active pixel array 110 in response to the decoded row control signal.

The active pixel array 110 may output a pixel signal and/or a focus detection signal, which is from the row selected in response to the row selection signal provided from the row driver 120, to the switching network 130.

The switching network 130 may output mixed signals using the focus detection signal output from the focus detection pixel 111-7 and the pixel signal output from at least one color pixel (e.g., 111-9) in response to control signals (e.g., switch control signals, output from the processing circuit 140).

The processing circuit 140 may output the control signals (e.g. the switch control signals) to the switching network 130 in response to a control signal (e.g., a focus detection control signal) output from the timing generator 165, thereby controlling the operation of the switching network 130. The processing circuit 140 may also process the mixed signals output from the switching network 130.

Figure 3:
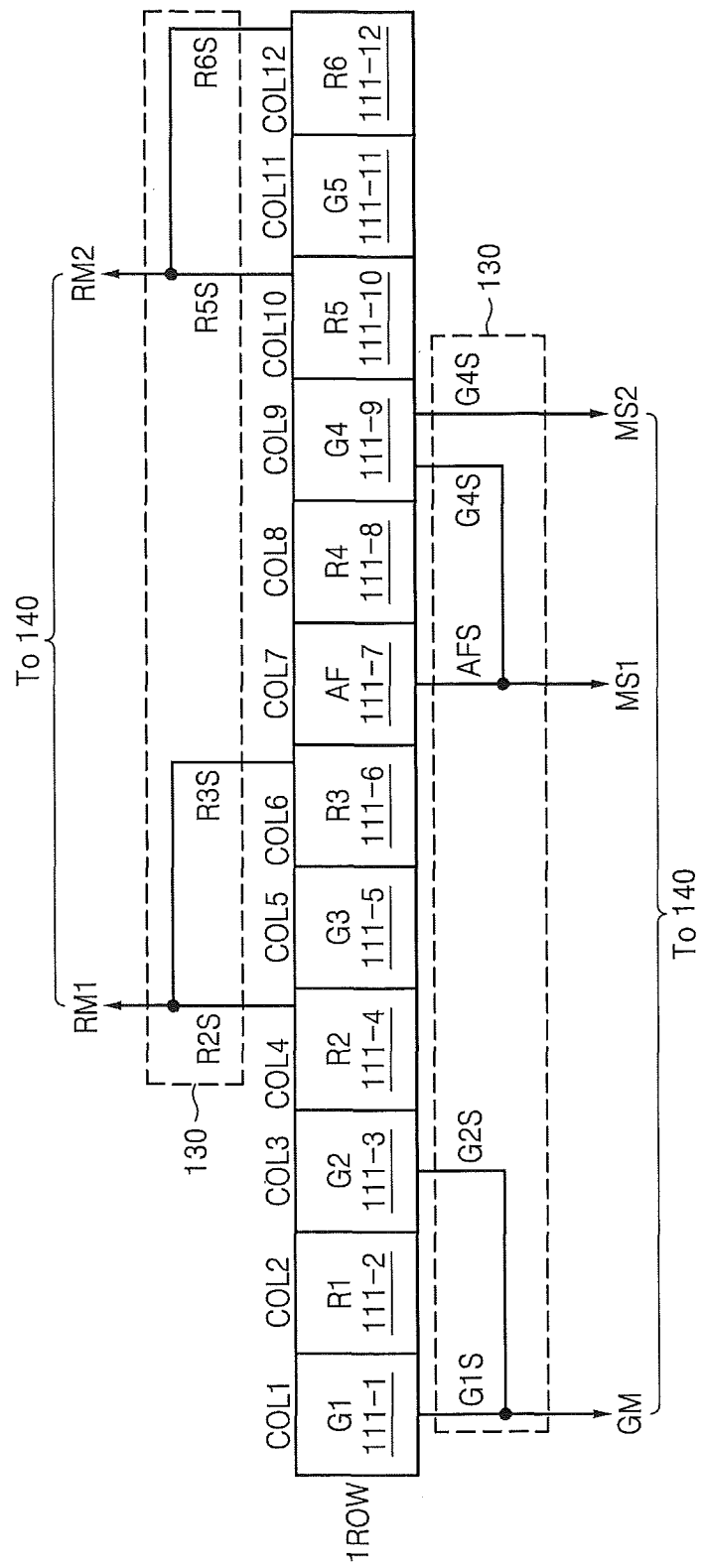
FIG. 3 is a conceptual diagram of an operation method of an image sensor according to some embodiments of the inventive concept.

FIG. 3 is a conceptual diagram of an operation method of the image sensor 100 according to some embodiments of the inventive concept. Referring to FIGS. 1 through 3, the switching network 130 may generate mixed signals by mixing pixel signals respectively output from the pixels 111 in response to the control signals (e.g., the switch control signals, from the processing circuit 140). For instance, the switching network 130 may generate a mixed signal GM by mixing pixel signals G1S and G2S respectively output from the color pixels 111-1 and 111-3 respectively positioned in the first column COL1 and the third column COL3, may generate a mixed signal RM1 by mixing pixel signals R2S and R3S respectively output from the color pixels 111-4 and 111-6 respectively positioned in the fourth column COL4 and the sixth column COL6, and may generate a mixed signal RM2 by mixing pixel signals R5S and R6S respectively output from the color pixels 111-10 and 111-12 respectively positioned in the tenth column COL10 and the twelfth column COL12.

When the pixels 111 include the focus detection pixel 111-7 and the first color pixel 111-9, the switching network 130 may generate a first mixed signal MS1 by mixing a focus detection signal AFS and a first pixel signal G4S and may generate the first pixel signal G4S as a second mixed signal MS2.

Figure 4:
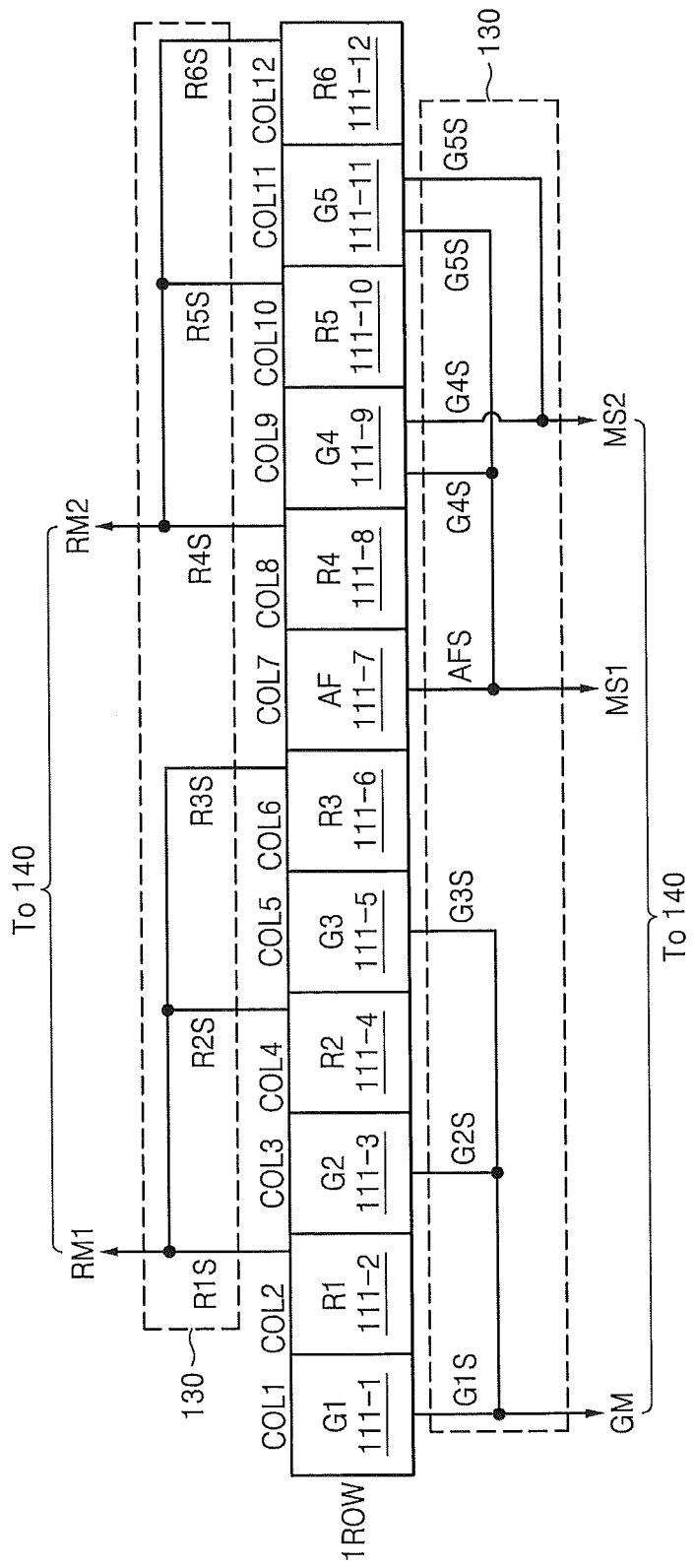
FIG. 4 is a conceptual diagram of an operation method of an image sensor according to other embodiments of the inventive concept.

FIG. 4 is a conceptual diagram of an operation method of the image sensor 100 according to other embodiments of the inventive concept. Referring to FIGS. 1, 2, and 4, the switching network 130 may generate mixed signals by mixing pixel signals respectively output from the pixels 111 in response to the control signals (e.g., the switch control signals, from the processing circuit 140). For instance, the switching network 130 may generate a mixed signal GM by mixing pixel signals G1S, G2S, and G3S respectively output from the color pixels 111-1, 111-3, and 111-5 respectively positioned in the columns COL1, COL3, and COL5; may generate a mixed signal RM1 by mixing pixel signals R1S, R2S, and R3S respectively output from the color pixels 111-2, 111-4, and 111-6 respectively positioned in the columns COL2, COL4, and COL6; and may generate a mixed signal RM2 by mixing pixel signals R4S, R5S, and R6S respectively output from the color pixels 111-8, 111-10, and 111-12 respectively positioned in the columns COL8, COL10, and COL12.

When the pixels 111 include the focus detection pixel 111-7, the first color pixel 111-9, and the second color pixel 111-11, the switching network 130 may generate a first mixed signal MS1 by mixing a focus detection signal AFS, a first pixel signal G4S, and a second pixel signal G5S and may generate a second mixed signal MS2 by mixing the first pixel signal G4S and the second pixel signal G5S.

Figure 5:
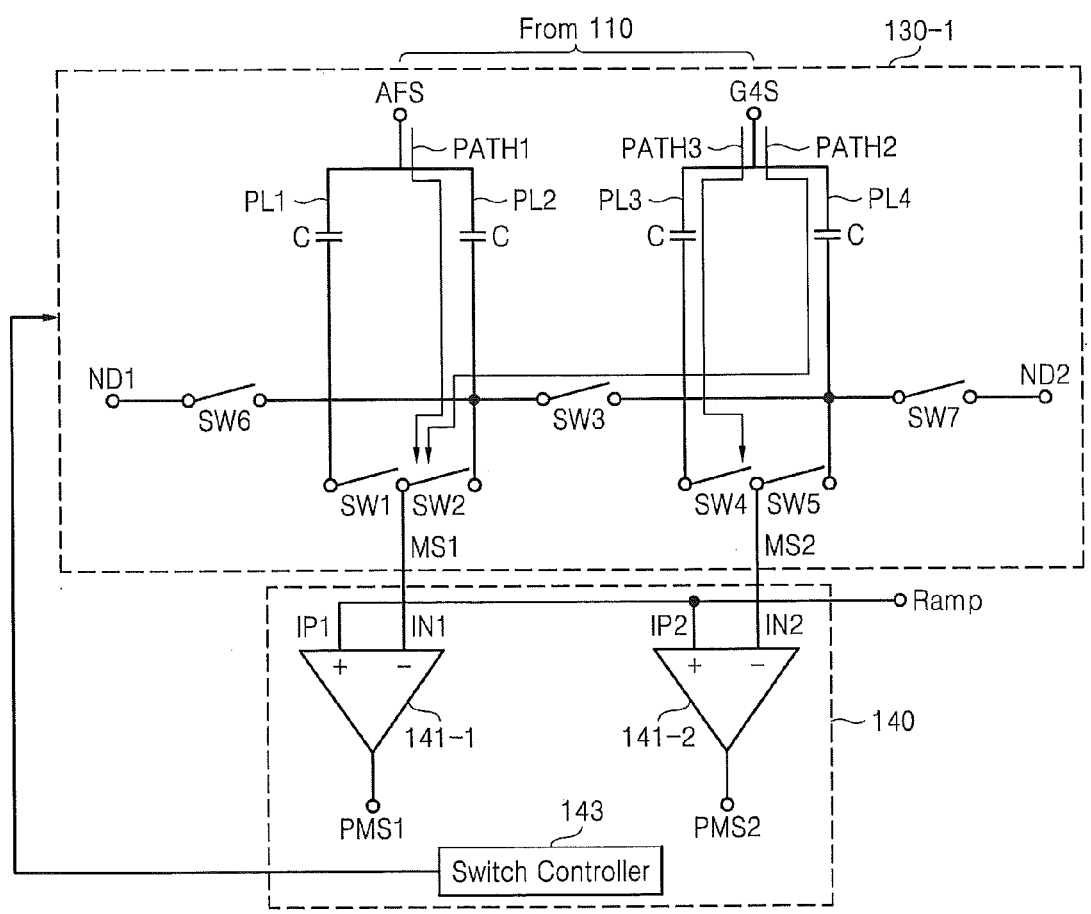
FIG. 5 is a circuit diagram for explaining the operation method of the image sensor illustrated in FIG. 3.

FIG. 5 is a circuit diagram for explaining the operation method of the image sensor 100 illustrated in FIG. 3. Referring to FIGS. 1, 2, 3, and 5, a switching network 130-1 illustrated in FIG. 5 is connected to the first row 1ROW illustrated in FIG. 3. FIG. 5 just illustrates the odd-numbered columns COL7 and COL9 in the first row 1ROW illustrated in FIG. 3. The switching network 130-1 illustrated in FIG. 5 is an example of the switching network 130 illustrated in FIG. 1.

The switching network 130-1 includes first transmission paths (or lines) PL1 and PL2, second transmission paths (or lines) PL3 and PL4, and an array of switches SW1 through SW7. The switching network 130-1 may generate the first mixed signal MS1 by mixing the focus detection signal AFS output from the focus detection pixel 111-7 and the first pixel signal G4S output from the first color pixel 111-9 and may generate the first pixel signal G4S as the second mixed signal MS2.

The focus detection signal AFS may be transmitted through the first transmission paths (or lines) PL1 and PL2. The first pixel signal G4S may be transmitted through the second transmission paths (or lines) PL3 and PL4. The first transmission paths PL1 and PL2 and the second transmission paths PL3 and PL4 may include a capacitor C, respectively.

In response to a switch control signal, the array of the switches SW1 through SW7 may be controlled to connect one of the first transmission paths PL1 and PL2 with one of the second transmission paths PL3 and PL4 and thereby to generate the first mixed signal MS1 and may be controlled to generate as the second mixed signal MS2 an output signal of the other one of the second transmission paths PL3 and PL4. In detail, when the switches SW1, SW5, SW6, and SW7 are turned off and the switches SW2, SW3, and SW4 are turned on in response to switch control signals, respectively, the focus detection signal AFS may be transmitted through a first path PATH1 and the first pixel signal G4S may be transmitted through second and third paths PATH2 and PATH3. Accordingly, the switching network 130-1 may generate the first mixed signal MS1 in which the focus detection signal AFS is mixed with the first pixel signal G4S and may generate the first pixel signal G4S as the second mixed signal MS2. The switch control signals may be generated by a switch controller 143. Alternatively, the switch control signals may be generated by the timing generator 165. The switching network 130-1 may output the first mixed signal MS1 and the second mixed signal MS2 to the processing circuit 140.

The processing circuit 140 may include comparators 141-1 and 141-2 and the switch controller 143. The processing circuit 140 may process (for example, may perform analog-to-digital conversion and/or amplification on) the first mixed signal MS1 and the second mixed signal MS2, which are output from the switching network 130-1, and output a processed first mixed signal PMS1 and a processed second mixed signal PMS2.

In detail, the processing circuit 140 may compare the first mixed signal MS1 input to a first input node IN1 of the first comparator 141-1 with a ramp signal Ramp, which is output from the ramp generator 155 (see, e.g., FIG. 1) and input to a second input node IP1 of the first comparator 141-1, and may output a comparison signal corresponding to the comparison result (i.e., the processed first mixed signal PMS1).

In addition, the processing circuit 140 may compare the second mixed signal MS2 input to a third input node IN2 of the second comparator 141-2 with the ramp signal Ramp, which is output from the ramp generator 155 (see, e.g., FIG. 1) and input to a fourth input node IP2 of the second comparator 141-2, and may output a comparison signal corresponding to the comparison result (i.e., the processed second mixed signal PMS2).

The processing circuit 140 may temporarily store the processed first mixed signal PMS1 and the processed second mixed signal PMS2 in memories (e.g., static random access memories (SRAMs)), respectively.

The processing circuit 140 may generate column selection signals. In detail, the processing circuit 140 may decode column control signals (e.g., column address signals) output from the timing generator 165 and select column paths respectively connected to the memories in response to the decoded column selection signals. Accordingly, the processing circuit 140 may sense the processed first mixed signal PMS1 and the processed second mixed signal PMS2 respectively from the memories respectively connected to the column paths and may amplify them before outputting them.

Figure 6:
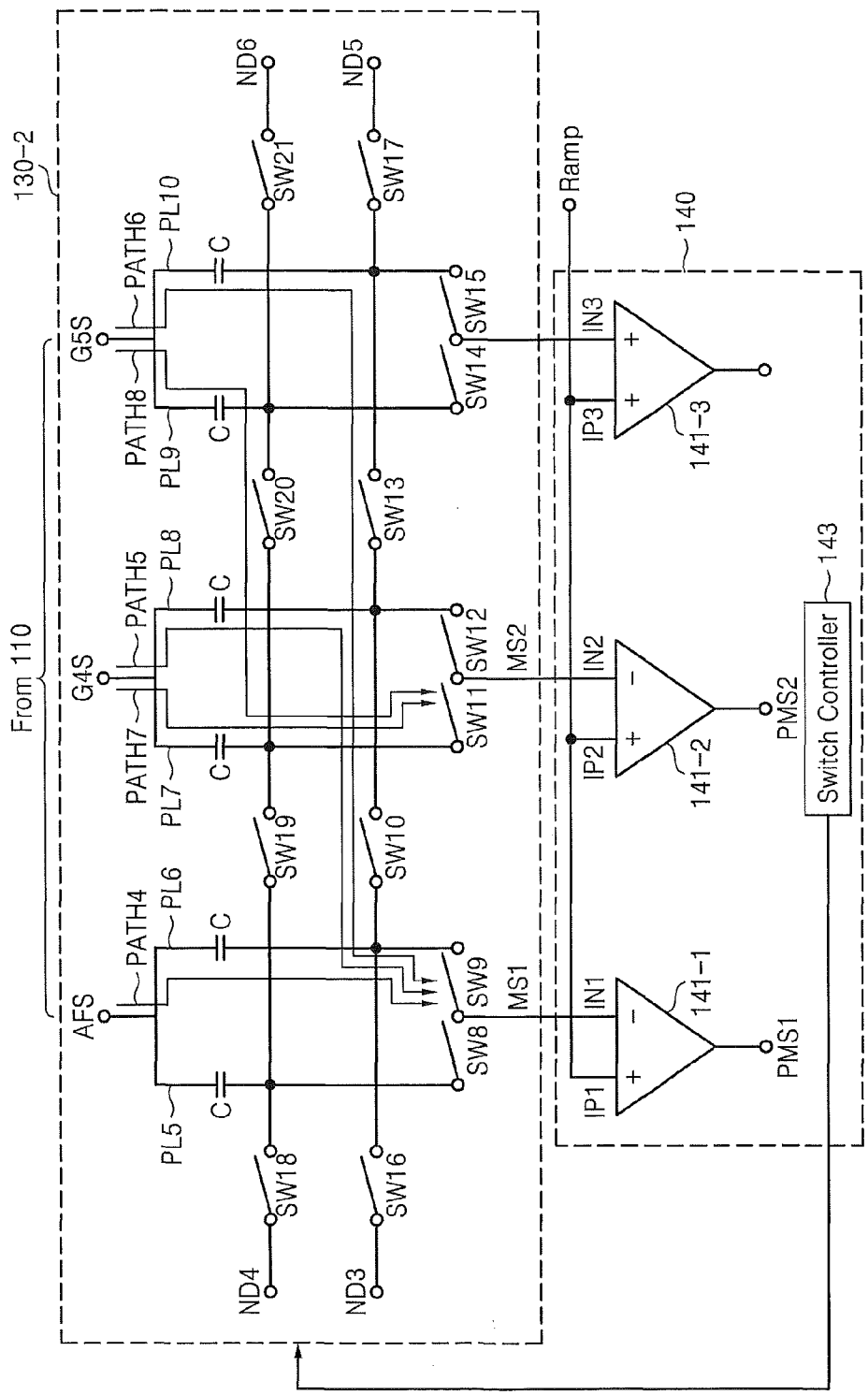
FIG. 6 is a circuit diagram for explaining the operation method of the image sensor illustrated in FIG. 4.

FIG. 6 is a circuit diagram for explaining the operation method of the image sensor 100 illustrated in FIG. 4. Referring to FIGS. 1, 2, 4, and 6, a switching network 130-2 illustrated in FIG. 6 is connected to the first row 1ROW illustrated in FIG. 4. FIG. 6 just illustrates the odd-numbered columns COL7, COL9, and COL11 in the first row 1ROW illustrated in FIG. 4. The switching network 130-2 illustrated in FIG. 6 is another example of the switching network 130 illustrated in FIG. 1.

The switching network 130-2 includes third transmission paths (or lines) PL5 and PL6, fourth transmission paths (or lines) PL7 and PL8, fifth transmission paths (or lines) PL9 and PL10, and an array of switches or switch arrangement SW8 through SW21. The switching network 130-2 may generate the first mixed signal MS1 by mixing the focus detection signal AFS, the first pixel signal G4S, and the second pixel signal G5S and may generate the second mixed signal MS2 by mixing the first pixel signal G4S and the second pixel signal G5S.

The focus detection signal AFS may be transmitted through the third transmission paths PL5 and PL6. The first pixel signal G4S may be transmitted through the fourth transmission paths PL7 and PL8. The second pixel signal G5S may be transmitted through the fifth transmission paths PL9 and PL10. The third through fifth transmission paths PL5 through PL10 may include a capacitor C, respectively.

In response to a switch control signal, the array of the switches SW8 through SW21 may be controlled to connect one of the third transmission paths PL5 and PL6, one of the fourth transmission paths PL7 and PL8, and one of the fifth transmission paths PL9 and PL10 with one another and thereby to generate the first mixed signal MS1 and may be controlled to connect the other one of the fourth transmission paths PL7 and PL8 with the other one of the fifth transmission paths PL9 and PL10 and thereby to generate the second mixed signal MS2.

In detail, when the switches SW8, SW12, SW14, SW15, SW16, SW17, SW18, SW19, and SW21 are turned off and the switches SW9, SW10, SW11, SW13, and SW20 are turned on in response to switch control signals, respectively; the focus detection signal AFS may be transmitted through a fourth path PATH4, the first pixel signal G4S may be transmitted through fifth and seventh paths PATH5 and PATH7, and the second pixel signal G5S may be transmitted through sixth and eighth paths PATH6 and PATH8.

Accordingly, the switching network 130-2 may generate the first mixed signal MS1 in which the focus detection signal AFS, the first pixel signal G4S, and the second pixel signals G5S are mixed with one another and may generate the second mixed signal MS2 in which the first pixel signal G4S and the second pixel signal G5S are mixed with each other. The switch control signals may be generated by a switch controller 145. Alternatively, the switch control signals may be generated by the timing generator 165.

The switching network 130-2 may output the first mixed signal MS1 and the second mixed signal MS2 to the processing circuit 140. The operation of the processing circuit 140 processing the first mixed signal MS1 and the second mixed signal MS2 is substantially the same as that described with reference to FIG. 5. Thus, descriptions thereof will be omitted.

Figure 7:
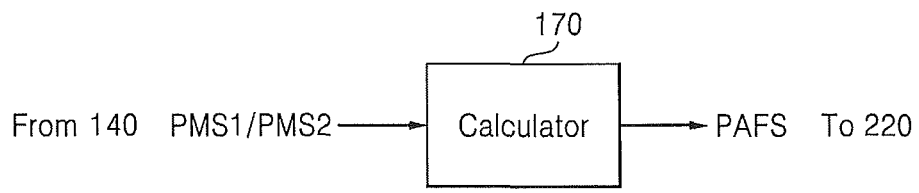
FIG. 7 is a block diagram for explaining the operation of a calculator illustrated in FIG. 1.

FIG. 7 is a block diagram for explaining the operation of the calculator 170 illustrated in FIG. 1. Referring to FIGS. 1 through 7, the processing circuit 140 may process the first mixed signal MS1 and the second mixed signal MS2 and output the processed first mixed signal PMS1 and the processed second mixed signal PMS2 to the calculator 170 in response to the column control signals (e.g., the column address signals) output from the timing generator 165.

The calculator 170 may calculate a signal PAFS generated by the focus detection pixel 111-7 based on a difference between the processed first mixed signal PMS1 and the processed second mixed signal PMS2. The signal PAFS generated by the focus detection pixel 111-7 refers to a signal obtained by processing the focus detection signal AFS output from the focus detection pixel 111-7 using the processing circuit 140.

When the pixels 111 include the focus detection pixel 111-7 and the first color pixel 111-9 as illustrated by FIG. 3, the calculator 170 may calculate the signal PAFS generated by the focus detection pixel 111-7 using Equation 1:

$$PAFS=2*PMS1-PMS2. \quad (1)$$

When the pixels 111 include the focus detection pixel 111-7, the first color pixel 111-9, and the second color pixel 111-11 as illustrated by FIG. 4, the calculator 170 may calculate the signal PAFS generated by the focus detection pixel 111-7 using Equation 2:

$$PAFS=3*PMS1-2*PMS2 \quad (2)$$

In other words, the calculator 170 may calculate the signal PAFS generated by the focus detection pixel 111-7 and output the signal PAFS to the image signal processor 220.

The image signal processor 220 may carry out the phase-difference autofocus method using the signal PAFS generated by the focus detection pixel 111-7. In detail, the image signal processor 220 may calculate a defocus amount using the signal PAFS generated by the focus detection pixel 111-7 and control the focal distance position of the lens 500 based on the defocus amount. The calculator 170 may be implemented in software for computing Equation 1 and/or Equation 2 or in hardware equipped with the software.

Figure 8:
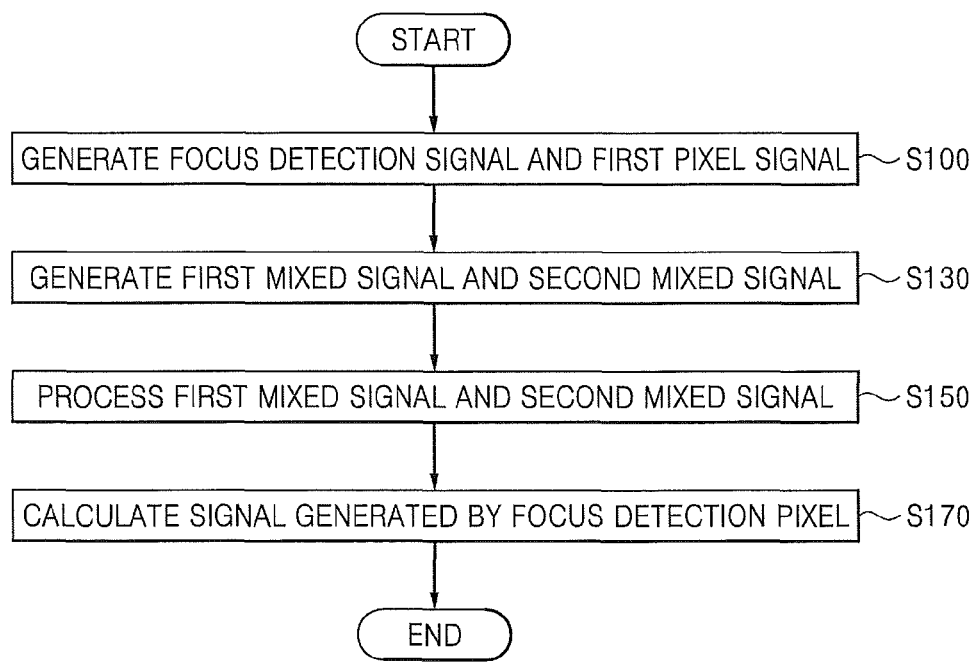
FIG. 8 is a flowchart of the operation method of the image sensor illustrated in FIG. 3.

FIG. 8 is a flowchart of the operation method of the image sensor 100 illustrated in FIG. 3. Referring to FIGS. 1, 3, 5, 7, and 8, the active pixel array 110 may generate the focus detection signal AFS using the focus detection pixel 111-7 and the first pixel signal G4S using the first color pixel 111-9 in operation S100. The switching network 130 may generate the first mixed signal MS1 by mixing the focus detection signal AFS with the first pixel signal G4S, which are output from the active pixel array 110, and may generate the second mixed signal MS2 using the first pixel signal G4S in operation S130. The processing circuit 140 may process the first mixed signal MS1 and the second mixed signal MS2 in operation S150. The calculator 170 may calculate the signal PAFS generated by the focus detection pixel 111-7 based on the difference between the processed first mixed signal PMS1 and the processed second mixed signal PMS2 in operation S170.

Figure 9:
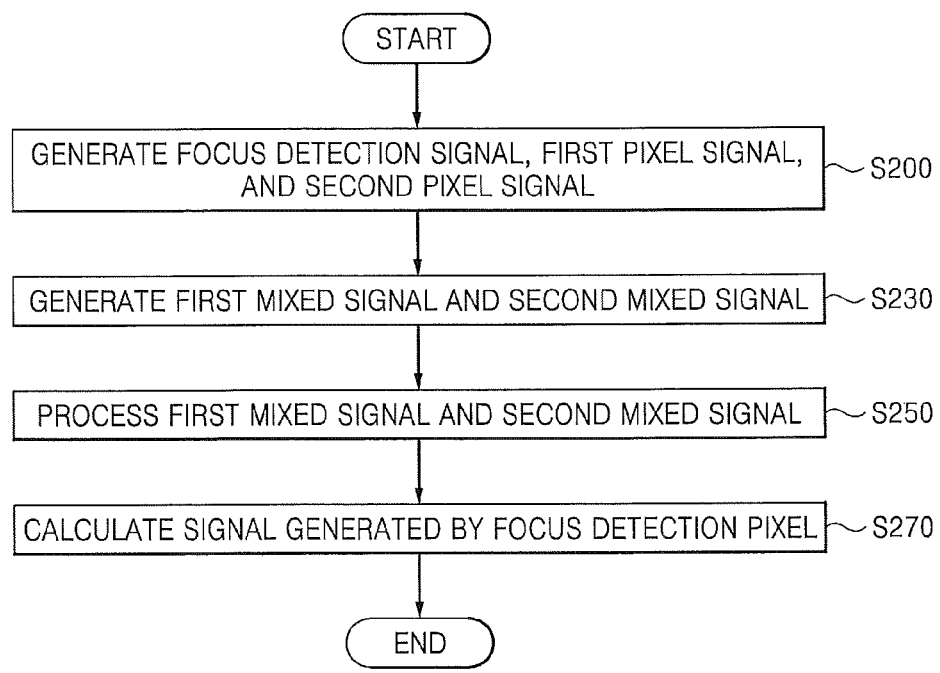
FIG. 9 is a flowchart of the operation method of the image sensor illustrated in FIG. 4.

FIG. 9 is a flowchart of the operation method of the image sensor 100 illustrated in FIG. 4. Referring to FIGS. 1, 4, 6, 7, and 9, the active pixel array 110 may generate the focus detection signal AFS using the focus detection pixel 111-7, the first pixel signal G4S using the first color pixel 111-9, and the second pixel signal G5S using the second color pixel 111-11 in operation S200. The switching network 130 may generate the first mixed signal MS1 by mixing the focus detection signal AFS, the first pixel signal G4S, and the second pixel signal G5S, which are output from the active pixel array 110, and may generate the second mixed signal MS2 by mixing the first pixel signal G4S and second pixel signal G5S the in operation S230. In other words, the first mixed signal MS1 may be a signal related with the focus detection signal AFS, the first pixel signal G4S, and the second pixel signal G5S; and the second mixed signal MS2 may be a signal related with the first pixel signal G4S and the second pixel signal G5S. The processing circuit 140 may process the first mixed signal MS1 and the second mixed signal MS2 in operation S250. The calculator 170 may calculate the signal PAFS generated by the focus detection pixel 111-7 based on the difference between the processed first mixed signal PMS1 and the processed second mixed signal PMS2 in operation S270.

Figure 10:
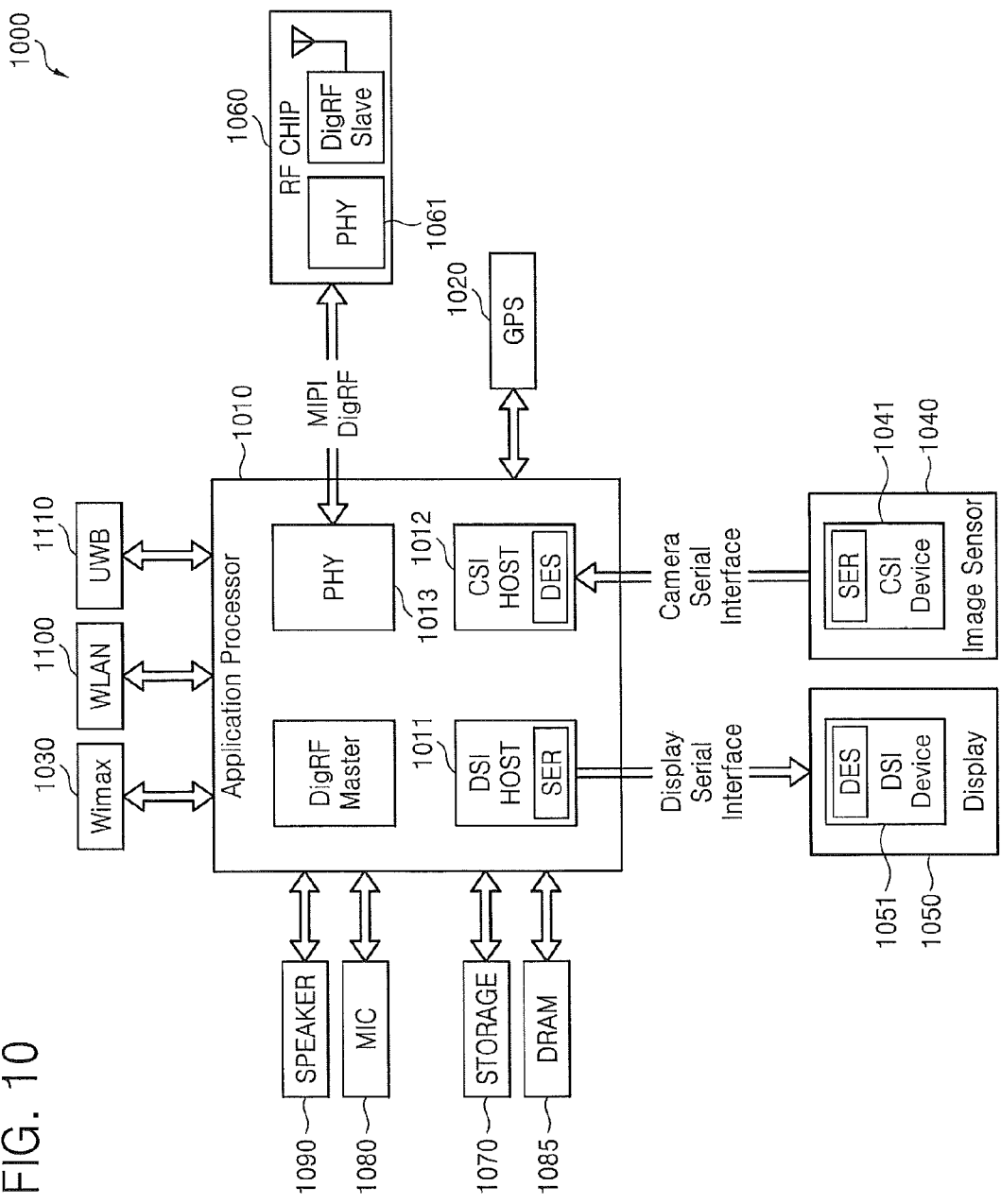
FIG. 10 is a schematic block diagram of an image sensing system including an image sensor according to other embodiments of the inventive concept.

FIG. 10 is a schematic block diagram of an image sensing system 1000 including an image sensor 1040 according to other embodiments of the inventive concept. Referring to FIG. 10, the image sensing system 1000 may be implemented as a data processing device, such as a mobile phone, a personal digital assistant (PDA), a portable media player (PMP), or a smart phone, which can use or support mobile industry processor interface (MIPI). The image sensing system 1000 includes an application processor 1010, then image sensor 1040, and a display 1050.

A camera serial interface (CSI) host 1012 implemented in the application processor 1010 may perform serial communication with a CSI device 1041 included in the image sensor 1040 through CSI. At this time, an optical deserializer and an optical serializer may be implemented in the CSI host 1012 and the CSI device 1041, respectively. The image sensor 1040 corresponds to the image sensor 100 described with reference to FIGS. 1 through 7.

A display serial interface (DSI) host 1011 implemented in the application processor 1010 may perform serial communication with a DSI device 1051 included in the display 1050 through DSI. At this time, an optical serializer and an optical deserializer may be implemented in the DSI host 1011 and the DSI device 1051, respectively. The image sensing system 1000 may also include a radio frequency (RF) chip 1060 communicating with the application processor 1010. A physical layer (PHY) 1013 of the application processor 1010 and a PHY 1061 of the RF chip 1060 may communicate data with each other according to MIPI DigRF.

The image sensing system 1000 may further include a global positioning system (GPS) 1020, a storage 1070, a microphone (MIC) 1080, a dynamic random access memory (DRAM) 1085, and a speaker 1090. The image sensing system 1000 may communicate using a worldwide interoperability for microwave access (Wimax) 1030, a wireless local area network (WLAN) 1100, and an ultra-wideband (UWB) 1110.

As described above, according to some embodiments of the inventive concept, an image sensor calculates a signal generated by a focus detection pixel and can thus perform a phase-difference autofocus method based on the signal.

While the present inventive concept has been particularly shown and described with reference to exemplary embodiments thereof, it will be understood by those of ordinary skill in the art that various changes in forms and details may be made therein without departing from the spirit and scope of the present inventive concept as defined by the following claims.

What is claimed is:

1. An image sensor, comprising:
an array of image sensor pixels comprising a first focus detection pixel and at least a first color pixel; and
a switching network electrically coupled to said array, said switching network configured to generate a first mixed image signal by electronically mixing a focus detection signal generated by the first focus detection pixel with at least one color pixel signal generated by the at least a first color pixel; and
a processing circuit configured to compare the first mixed image signal against a ramp signal using a first comparator.

2. The image sensor of claim 1, wherein said switching network comprises first and second transmission paths configured to pass the focus detection signal and the at least one color pixel signal, respectively, to a commonly-connected node.

3. The image sensory of claim 2, wherein the first and second transmission paths are switch-enabled transmission paths comprising first and second serially-connected capacitors, respectively.

4. The image sensor of claim 2, wherein the first transmission path comprises a first serially-connected capacitor configured to filter the focus detection signal and the second transmission path comprises a second serially-connected capacitor configured to filter the at least one color pixel signal.

5. The image sensor of claim 1, wherein the first and second transmission paths are switch-enabled transmission paths comprising first and second capacitors, respectively; wherein the first capacitor has a first terminal responsive to the focus detection signal and a second terminal directly connected to the commonly-connected node; and wherein the second capacitor has a first terminal responsive to the at least one color pixel signal and a second terminal directly connected to the commonly-connected node.

6. The image sensor of claim 5, wherein said switching network further comprises a third transmission path configured to filter the at least one color pixel signal through a third capacitor; and wherein said processing circuit is further configured to compare the filtered at least one color pixel signal at a terminal of the third capacitor against the ramp signal using a second comparator.

7. The image sensor of claim 6, further comprising a calculator configured to generate a calculator output signal having a magnitude proportional to a difference between a first operand, which is proportional to an output signal generated by the first comparator, and a second operand, which is proportional to an output signal generated by the second comparator.

8. An image sensor comprising:
an active pixel array including a focus detection pixel and a first color pixel;
a switching network configured to generate a first mixed signal by mixing a focus detection signal output from the focus detection pixel with a first pixel signal output from the first color pixel and to generate the first pixel signal as a second mixed signal;
a processing circuit configured to process the first mixed signal and the second mixed signal; and
a calculator configured to generate an output signal based on a difference between a first operand proportional to the processed first mixed signal and a second operand proportional to the processed second mixed signal.

9. The image sensor of claim 8, wherein the switching network comprises:
a plurality of first transmission paths configured to transmit the focus detection signal;
a plurality of second transmission paths configured to transmit the first pixel signal; and
an array of switches configured to be controlled to connect one of the first transmission paths with one of the second transmission paths to generate the first mixed signal and to be controlled to generate an output signal of another one of the second transmission paths as the second mixed signal in response to switching control signals.

10. The image sensor of claim 9, wherein the first transmission paths and the second transmission paths comprise a capacitor, respectively.

11. The image sensor of claim 8, wherein the active pixel array further comprises a second color pixel generating a second pixel signal, wherein the switching network generates the first mixed signal by mixing the focus detection signal, the first pixel signal, and the second pixel signal with one another and generates the second mixed signal by mixing the first pixel signal with the second pixel signal.

12. The image sensor of claim 11, wherein the switching network comprises:
a plurality of first transmission paths configured to transmit the focus detection signal;
a plurality of second transmission paths configured to transmit the first pixel signal;
a plurality of third transmission paths configured to transmit the second pixel signal; and
an array of switches configured to be controlled to connect one of the first transmission paths, one of the second transmission paths, and one of the third transmission paths with one another to generate the first mixed signal and to connect another one of the second transmission paths with another one of the third transmission paths to generate the second mixed signal in response to switching control signals.

13. The image sensor of claim 12, wherein the first transmission paths, the second transmission paths, and the third transmission paths comprise a capacitor, respectively.

14. The image sensor of claim 8, wherein the processing circuit comprises a plurality of comparators configured to compare the first mixed signal and the second mixed signal, respectively, with a ramp signal.

15. The image sensor of claim 8, wherein the first operand is equivalent to two times the processed first mixed signal and the second operand is equivalent to one times the processed second mixed signal.

16. The image sensor of claim 8, wherein the first operand is equivalent to three times the processed first mixed signal and the second operand is equivalent to two times the processed second mixed signal.

17. An image sensing system comprising:
an active pixel array including a focus detection pixel and a first color pixel;
a switching network configured to generate a first mixed signal by mixing a focus detection signal output from the focus detection pixel with a first pixel signal output from the first color pixel and to generate the first pixel signal as a second mixed signal;
a processing circuit configured to process the first mixed signal and the second mixed signal;
a calculator configured to generate an output signal based on a difference between a first operand proportional to the processed first mixed signal and a second operand proportional to the processed second mixed signal; and
a digital signal processor configured to control an operation of the image sensor.

18. The image sensing system of claim 17, wherein the switching network comprises:
a plurality of first transmission paths configured to transmit the focus detection signal;
a plurality of second transmission paths configured to transmit the first pixel signal; and
an array of switches configured to be controlled to connect one of the first transmission paths with one of the second transmission paths to generate the first mixed signal and to be controlled to generate an output signal of another one of the second transmission paths as the second mixed signal in response to switching control signals.

19. The image sensing system of claim 17, wherein the active pixel array further comprises a second color pixel generating a second pixel signal, wherein the switching network generates the first mixed signal by mixing the focus detection signal, the first pixel signal, and the second pixel signal with one another and generates the second mixed signal by mixing the first pixel signal with the second pixel signal.

20. The image sensing system of claim 19, wherein the switching network comprises:
   a plurality of first transmission paths configured to transmit the focus detection signal;
   a plurality of second transmission paths configured to transmit the first pixel signal;
   a plurality of third transmission paths configured to transmit the second pixel signal; and
   an array of switches configured to be controlled to connect one of the first transmission paths, one of the second transmission paths, and one of the third transmission paths with one another to generate the first mixed signal and to connect another one of the second transmission paths with another one of the third transmission paths to generate the second mixed signal in response to switching control signals.

21. The image sensing system of claim 17, wherein the first operand is equivalent to two times the processed first mixed signal and the second operand is equivalent to one times the processed second mixed signal.

22. The image sensing system of claim 17, wherein the first operand is equivalent to three times the processed first mixed signal and the second operand is equivalent to two times the processed second mixed signal.

23. An operation method of an image sensor, the operation method comprising:
   generating a focus detection signal using a focus detection pixel and a first pixel signal using a first color pixel;
   generating a first mixed signal by mixing the focus detection signal with the first pixel signal and generating a second mixed signal using the first pixel signal;
   processing the first mixed signal and the second mixed signal; and
   calculating a signal generated by the focus detection pixel based on a difference between a processed first mixed signal and a processed second mixed signal.

24. The operation method of claim 23, further comprising generating a second pixel signal using a second color pixel,
   wherein the first mixed signal is a signal related with the focus detection signal, the first pixel signal, and the second pixel signal and wherein the second mixed pixel signal is a signal related with the first pixel signal and the second pixel signal.

* * * * *